Sept. 21, 1971  M. G. ALWOOD  3,606,829
DRIP COFFEE MAKER
Filed April 10, 1969
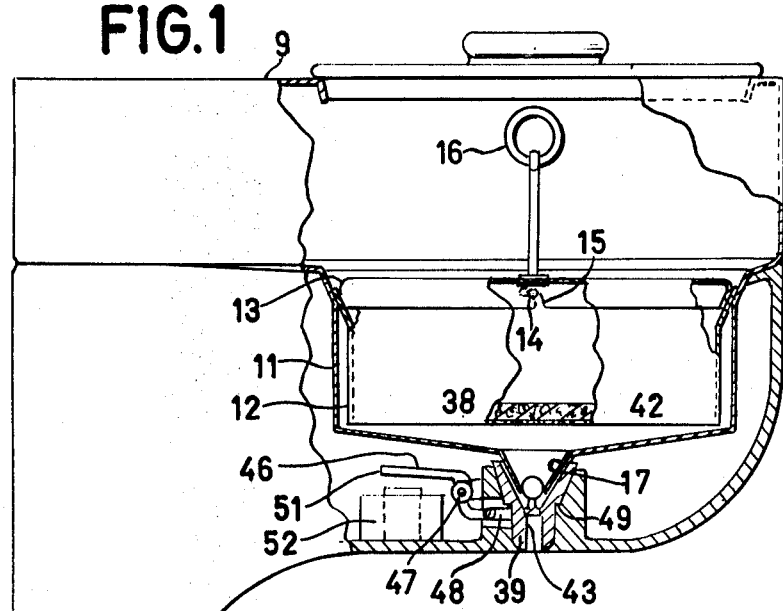
FIG.1
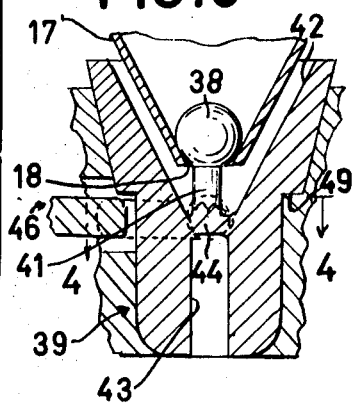
FIG.3
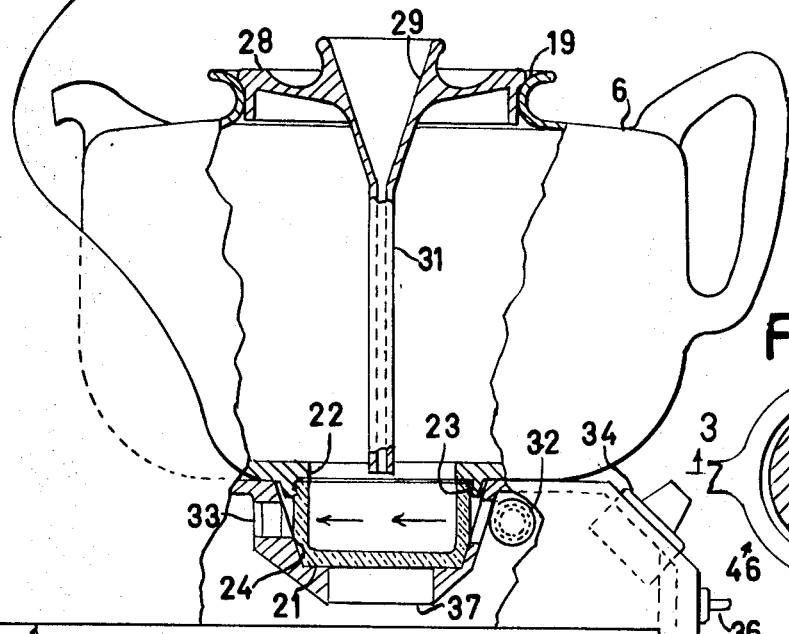
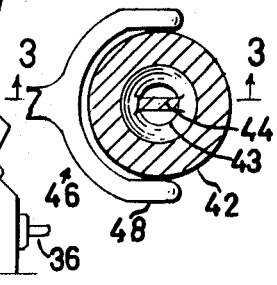
FIG.4
FIG.2
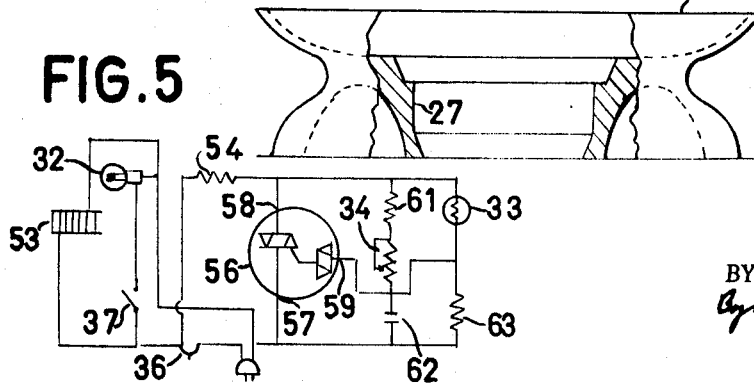
FIG.5
INVENTOR.
MELVIN G. ALWOOD
BY
ATTORNEYS

3,606,829
DRIP COFFEE MAKER
Melvin G. Alwood, 733 Butte St.,
Redding, Calif. 96001
Filed Apr. 10, 1969, Ser. No. 814,954
Int. Cl. A47j 31/10
U.S. Cl. 99—280                                      7 Claims

ABSTRACT OF THE DISCLOSURE

A beam of light is passed through a representative portion of the coffee in the pot of drip coffee maker and onto a photo-electric device. When the strength of the coffee reaches a predetermined level, as determined by the intensity of the light beam transmitted thereby and falling on the photo-electric device, a valve is closed preventing the passage of water from the grounds into the pot, thereby terminating the brewing process.

BACKGROUND OF THE INVENTION

The invention relates to the making of coffee and in particular it relates to apparatus and a method for making coffee in which the strength of the coffee being made is optically sensed and the making ceased when a desired strength has been reached.

The brewing of coffee basically entails the passage of hot water over ground coffee beans so as to remove certain soluble solids therefrom. This is preferably done at a temperature slightly below that of boiling water to avoid the removal, in addition, of certain acids from the beans, and one of the most common coffee makers which may utilize water of such a temperature is a drip coffee maker. In such a coffee maker the ground coffee is suspended in a porous container above an empty coffee pot and water of the desired temperature is then simply poured into the porous container to pass through the grounds and drip into the empty pot. The brewing is commonly stopped when all of the water supplied to the porous container has passed therethrough and into the pot, and the strength of the resulting coffee is commonly determined by the amount of ground coffee placed in the basket and the amount of hot water poured thereinto. No attempt is generally made to monitor the strength of the coffee in the pot during the brewing process so as to terminate this process when a desired strength of coffee has been obtained.

SUMMARY OF THE INVENTION

The invention provides apparatus and a method for monitoring the intensity of the coloring of the coffee, and thus the resistance to the passage of light therethrough, as it is brewing and for terminating the brewing process when a certain predetermined strength, as measured by the color intensity, has been reached. In the brewing of coffee by the drip method, the first water to pass through the grounds removes proportionally more soluble solids therefrom than does the water which follows it. Accordingly, the first coffee into the pot is the strongest and darkest, and, as more water is added, the coffee gets progressively lighter and weaker. The invention utilizes this characteristic of the brewing process by passing a light beam through a representative portion of the coffee as it is brewing onto a sensor which causes the brewing process to be terminated by discontinuing the passage of water from the grounds into the pot when a predetermined degree of lightness of the coffee has been reached, as measured by the amount of light passed therethrough. Thus it is a physical characteristic of the coffee itself which determines the strength of the resulting product and the same strength may be obtained in succeeding batches regardless of how much ground coffee is utilized or of the presence of any other variables.

It is thus an object of the invention to provide a coffee maker in which the strength of the coffee brewed is determined by a physical characteristic of the coffee itself.

Another object of the invention is to provide a coffee maker in which the strength of the coffee is determined by its color density.

Another object of the invention is to provide a coffee maker in which the strength of the coffee is determined by the intensity of a light beam transmitted through the coffee upon its emergence therefrom.

Another object of the invention is to provide a method for making coffee in which a physical characteristic of the brewed coffee determines its strength.

Another object of the invention is to provide a method for making coffee in which the color density of the coffee determines its strength.

Another object of the invention is to provide a method for making coffee in which a light beam is passed therethrough and its strength upon emergence determines the strength thereof.

Still another object of the invention is to provide better apparatus and methods for making coffee.

Other objects and advantages of the invention will become apparent from the drawings, specification, and claims included herewith.

DESCRIPTION OF THE DRAWINGS

FIG. 1 is an elevational view of the coffee maker embodying the invention with portions thereof broken away or shown in phantom;

FIG. 2 is an elevational view of a stand for a coffee pot of the invention with portions thereof broken away;

FIG. 3 is a vertical cross-sectional view through the valve of the coffee maker of FIG. 1 shown to a substantially larger scale, the section being taken along line 3—3 of FIG. 4;

FIG. 4 is a horizontal cross-sectional view of the valve of FIG. 3 taken along the line 4—4 of FIG. 3;

FIG. 5 is a circuit diagram of a circuit which may be used to operate the coffee maker of the invention.

DESCRIPTION OF THE PREFERRED EMBODIMENT

The coffee maker of the invention is based on the conventional elements of a drip coffee maker which include a pot 6 supportable on a stand 7 in the base portion 8 of which is included a heating element (not shown) capable of holding the pot 6 and its contents at a suitable holding temperature for coffee. The stand 7 also includes an upper portion 9 containing a water reservoir 11 in which may be positioned a porous bottomed container or basket 12 designed for holding ground coffee. Water of the optimum brewing temperature may be supplied to the reservoir 11 from any convenient source. The basket 12 is designed to snugly fit within the reservoir 11 at its upper end so that all water passing from the source must pass therethrough and a porous top 13 for the basket 12, fastenable thereto by a bayonet latch comprising pins 14 extending inwardly from the basket 12 and mating slots 15 in the top 13, assures that water passes evenly through all parts of the basket 12. A handle 16 attached to the top 13 may be provided to facilitate removal of the top 13 and basket 12 from the reservoir 11. The bottom of the reservoir 11 is sloped into a funnel 17 through the bottom of which is an orifice 18 by which water passing through the reservoir 11 is directed into the mouth 19 of the pot 6. Thus all the elements of the conventional drip coffee pot, broadly speaking, are present and when coffee grounds are placed in the basket 12 and water poured onto the porous top 13 thereof, the water will dissolve the soluble solids from the coffee grounds and carry them through orifice 18 in the funnel 17 of the reservoir 11 into the pot 6 resulting in brewed coffee.

In accordance with the invention, the pot 6 has certain special characteristics. To prevent the passage of light therethrough, it is opaque except for a cup 21 extending downwardly from the bottom thereof. This cup 21 may be a permanent part of the pot 6, or the pot may be formed with a hole 22 in the bottom thereof which hole 22 is surrounded by screw threads 23 by which the cup 21 may be removably attached thereto. The latter form is the preferred embodiment because of the relative ease of cleaning the assembly. The base portion 8 of the stand 7 is then formed with a recess 24 therein to receive the cup 21 on the pot 6 and a base 26 (FIG. 2) is provided having a similar recess 27 therein upon which the pot 6 may be set if it is away from the brewing stand 7. The mouth 19 of the pot 6 is also provided with an insert 28 having an open funnel-like central portion 29 positioned below the orifice 18 of the reservoir 11 and having a long stem 31 extending from the bottom thereof to the upper open end of the cup 21. Thus all brewed coffee entering the pot 6 from the reservoir 11 must pass in the vicinity of the cup 21 as it enters the pot 6 so that the coffee within the pot 6 may stay well mixed and the coffee in the cup 21 is representative of the coffee in the pot 6 in general.

In addition to the recess 24 to receive the cup 21 on the pot 6, the stand 7 is also modified in several respects in accordance with the invention. Positioned to one side of the recess 24 is a lamp 32 by which a beam of light may be passed into the cup 21 of the pot 6. Similarly positioned on the other side of the recess 24 is a light sensitive element 33 designed to receive the beam from lamp 32 when it has passed through the cup 21 and the coffee therein. A potentiometer 34 and a circuit breaker 36 are also mounted on the base in positions accessible to the user of the coffee maker. Finally a normally open micro-switch 37 is positioned at some point within the base portion 8 of the stand 7 so that some portion of the pot 6 rests thereon. The micro-switch 37 is of the type that will be switched to its closed condition by the weight of the pot 6, but only when the pot 6 has enough coffee therein to more than fill the cup 21.

The upper portion 9 of the stand 7 is also modified somewhat in accordance with the invention. Positioned within the funnel 17 of the reservoir 11 is a valve ball 38 of sufficient size that, when allowed to fall to the bottom of the funnel 17, it will close the orifice 18 to the further passage of water therethrough. A valve riser 39 (FIGS. 3 and 4) is also provided to raise the valve ball 38 in the funnel 17 from orifice 18 and permit water to flow therethrough. This riser 39 may take any convenient form in which a stud 41 having external dimensions smaller than the orifice 18 is movable up through the orifice 18 to push the valve ball 38 away therefrom. In the preferred embodiment, this stud 41 is supported by a funnel shaped piece 42 designed to move vertically about the exterior of the funnel 17 of the reservoir 11. The funnel shaped piece 42 has a throat portion 43 in which the stud 41 is mounted by webs 44. Thus when the piece 42 is raised the stud 41 is pushed up through the orifice 18 to raise the ball 38 therein and coffee is permitted to flow through the orifice 18, through the throat 43 past the webs 44, and into the pot 6. The riser 39 is raised by a lifter 46 having a pivotal mount 47 on the stand 7, having forks 48 which cooperate with shoulders 49 on the riser 39 to raise the riser 39 when the lifter 46 is pivoted, and having a shank 51 made of some magnetic material such as soft iron. An electro-magnet 52 may then be positioned beneath the shank 51 such that operation of the electro-magnet 52 draws the shank 51 thereto and causes the lifter 46 to pivot and raise the riser 39 to open the valve ball 38.

FIG. 5 shows a circuit which may be utilized to operate the coffee maker of the invention. It will be described in connection with a discussion of the operation of the coffee maker as it passes through a brewing cycle.

When it is desired to brew a pot of coffee, and the normal preparational steps, such as filling the basket 12 with ground coffee, have been completed, the circuit breaker 36 is depressed. This completes a circuit through the coil 53 of the electro-magnet 52, raising the valve ball 38 and allowing water passing through the ground coffee in the basket 12 to enter the pot 6. Similarly the closing of the circuit breaker 36 completes a circuit through the load resistor 54 and a variable resistance device 56, which in the preferred embodiment is a RCA Triac type 40431, whose conductivity between the first and second main terminals, 57 and 58 respectively, over a full AC cycle is determined by the AC voltage between the gate 59 and first main terminal 57 thereof. This voltage is in turn determined by the network including resistor 61, potentiometer 34, light sensitive device 33, capacitor 62 and resistor 63. In the preferred embodiment the light sensitive device 33 is a cadmium sulfide photo-conductive cell, RCA type 4453, whose conductivity increases with the intensity of the light incident thereupon. Thus with no light incident upon the light sensitive device 33, the voltage at the gate 59 of the Triac 56 will be low and little current will be drawn through the circuit breaker 36 thereby. Nominal values for the components in the circuit in the preferred embodiment are:

Resistor 61, 47K± 10%, 0.5 w.
Potentiometer 34, 50K 0.5 w., linear taper
Capacitor 62, 0.1 mfd., 200 wv. DC
Resistor 63, 10K± 10%, 0.5 w.

As coffee begins to flow into the pot 6, a sufficient amount will soon be received therein to activate the micro-switch 37. This will complete a circuit through the lamp 32, turning it on, however, because of the initial darkness and strength of the coffee, insufficient light will pass through the coffee in the cup 21 of the pot 6 to sufficiently increase the conductivity of the light sensitive device 33. As more coffee enters the pot 6, however, the coffee therein will get weaker and lighter and eventually when a predetermined strength is reached, sufficient light will pass therethrough to cause the light sensitive device 33 to conduct sufficiently that the voltage at the gate 59 of the Triac 56 will be increased to the point where the Triac 56 conducts a sufficient amount of current to cause the circuit breaker 36 to interrupt the entire circuit. This will also interrupt the circuit through the coil 53 of the electromagnet 52 which will cause the ball 38 to drop into the orifice 18 and discontinue the flow of coffee into the pot 6. The value of the load resistor 54 may be chosen according to the type of circuit breaker 36 used such that the circuit breaker will be interrupted when the strength and darkness of the coffee is within a certain acceptable range and the potentiometer 34 may be adjusted over this range to choose the particular strength desired.

From the foregoing description it is seen that the method that is practiced is one in which coffee is brewed to a predetermined strength and color density by supporting a body of clear water at coffee brewing temperature over a body of coffee grounds and discharging the water into a receptacle positioned therebelow, the color density of the water discharged into the receptacle thereby progressively decreasing as the quantity of soluble solids in the coffee grounds is expended. The initial portion of the water discharged into the receptacle is collected in the bottom thereof and a light beam is passed therethrough onto an electro-responsive medium having an electrical characteristic which has a value regulated by the intensity of the light incident thereupon. The color density of the collected water is progressively reduced as additional water having a lower color density is passed through the grounds and into the receptacle and mixed therewith, and when the color density of the brew of coffee is reduced to a predetermined value less than the initial color density of the initial water collected in the bottom of the receptacle, as measured by the value of the electrical characteristic of the electro-responsive medium, the discharge of the water from the body of the coffee grounds into the receptacle is discontinued so that the brew of coffee in the receptacle retains this predetermined strength and color density.

It should be understood that the above detailed description discloses the preferred embodiment of the invention, but it is not intended to be limiting, as other forms and modifications may occur to those skilled in the art which will not depart from the spirit of the invention and which come within the scope of the appended claims.

I claim:

1. In a coffee maker including water-supporting means for supporting a body of clear, heated water at coffee brewing temperature over a body of coffee grounds for passage of water from said body thereof through said grounds, ground-supporting means for supporting such body of coffee grounds below said water-supporting means, and a receptacle below said water-supporting means and said ground-supporting means to receive water passed from said water-supporting means through grounds in said ground-supporting means;
   (a) means providing a passageway between said ground-supporting means and said receptacle for passage of water that passes through said grounds from the water-supporting means,
   (b) interrupting closure means supported for movement from a position opening said passageway to passage of water therethrough from said grounds to a closed position closing said passageway to said flow, and
   (c) means responsive to variations in the color density of the water that has passed through said passageway into said receptacle operatively connected with said closure means for moving said closure from said open position to said closed position whereby the brew of coffee in said receptacle will be of a predetermined uniform strength at the time said closure means is moved to said closed position.

2. The coffee maker of claim 1 in which;
   (d) said passageway providing means includes a constricted portion therein and
   (e) said interrupting closure means includes
       (i) a blocking element of a dimension sufficient to close said constricted portion positioned in said passageway for motion into and out of said constricted portion and
       (ii) means for moving said blocking element into and out of said constricted portion.

3. The coffee maker of claim 1 in which;
   (d) said passageway providing means includes a funnel portion forming a surface of revolution having a circular outlet orifice in the bottom thereof, and
   (e) said interrupting closure means includes
       (i) a spherical ball having a radius larger than the radius of said circular outlet orifice positioned in said funnel portion for motion into said orifice and
       (ii) means for lifting said ball out of said orifice.

4. In the coffee maker of claim 1;
   (d) a source of a beam of light mounted to transmit said beam into the water in said receptacle to pass through a representative portion of said water with an intensity upon emergence therefrom which varies inversely as the color density of said water, and
   (e) said means responsive to variations in the color density of the water that has passed through said passageway into said receptacle includes
       (i) an electro-responsive medium having an electrical characteristic the value of which is regulated by the intensity of the light incident thereon and
       (ii) means for measuring the value of said electrical characteristic.

5. In the coffee maker of claim 1;
   (d) said receptacle has a transparent portion positioned to collect the first of the water received by said receptacle
   (e) a source of a beam of light mounted to transmit said beam through said transparent portion and the water contained therein with an intensity upon the emergence therefrom which varies inversely with the density of the color of said water; and
   (f) said means responsive to variations in the color density of the water that has passed through said passageway into said receptacle includes means for detecting the intensity of said beam upon emergence from the water in said transparent portion.

6. In the coffee maker of claim 5;
   (g) means for passing all water received in said receptacle from said water-supporting means through said grounds in said ground-supporting means in the neighborhood of said transparent portion for mixing with the water therein whereby the color density of the water in said transparent portion is substantially the same as that of the water in the remainder of said receptacle.

7. In the coffee maker of claim 5;
   (g) means to prevent said means responsive to variations in the color density of the water that has passed through said passageway into said receptacle from operating said closure means until said transparent portion is substantially filled with water.

References Cited
UNITED STATES PATENTS

| | | | |
|---|---|---|---|
| 2,502,844 | 4/1950 | Hildreth | 99—282 |
| 2,829,583 | 4/1958 | Leonard | 99—282 |
| 3,463,075 | 8/1969 | Wickenberg | 99—282 |

ROBERT W. JENKINS, Primary Examiner

U.S. Cl. X.R.

99—65, 306